(12) United States Patent
Dimitrov et al.

(10) Patent No.: US 10,914,588 B1
(45) Date of Patent: Feb. 9, 2021

(54) PULSE PER SECOND SIGNAL GENERATION USING A FIBER OPTIC GYROSCOPE

(71) Applicant: TOYOTA RESEARCH INSTITUTE, INC., Los Altos, CA (US)

(72) Inventors: Velin Dimitrov, Arlington, MA (US); Mathew Dedonato, Watertown, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/706,412

(22) Filed: Dec. 6, 2019

(51) Int. Cl.
*G01C 19/72* (2006.01)
*G02B 6/44* (2006.01)

(52) U.S. Cl.
CPC ......... *G01C 19/721* (2013.01); *G02B 6/4458* (2013.01)

(58) Field of Classification Search
CPC ...... G01C 19/64; G01C 19/72; G01C 19/721; G01C 19/722
See application file for complete search history.

(56) References Cited

U.S. PATENT DOCUMENTS 5,757,786 A 5/1998 Joo
9,784,843 B2 10/2017 Dolinar et al.
2009/0002232 A1* 1/2009 Kan .................. G01S 19/23
342/357.62
2018/0188032 A1* 7/2018 Ramanandan .......... G01S 19/53
2018/0199298 A1* 7/2018 Wakabayashi .... H04W 56/0015
2019/0011544 A1* 1/2019 Gassend ............... G01S 7/4972
2020/0159239 A1* 5/2020 Li .......................... G06T 7/74
2020/0257009 A1* 8/2020 Pei ........................ G01V 1/181

FOREIGN PATENT DOCUMENTS

CN 103279058 B 5/2015
CN 105319567 B 4/2018

OTHER PUBLICATIONS

Wu, et al., "Robust SINC/GNSS Integration Method for High Dynamic Applications", TELKOMNIKA Indonesian Journal of Electrical Engineering, Feb. 2015, pp. 292-299, vol. 12, No. 2.

* cited by examiner

*Primary Examiner* — Michael A Lyons
(74) *Attorney, Agent, or Firm* — Seyfarth Shaw LLP; George Haight (57) ABSTRACT

A fiber optic gyroscope inputs laser light into opposing ends of a fiber optic coil and detects light at the same ends of the optical fiber. A pulse-per-second signal is generated by determining the phase difference between the two opposing laser light signals, and generating electrical pulses based on this detected phase difference. The fiber optic gyroscope may become a source of one or more PPS signals used by a vehicle.

20 Claims, 4 Drawing Sheets

PULSE PER SECOND SIGNAL GENERATION USING A FIBER OPTIC GYROSCOPE

FIELD OF TECHNOLOGY

Aspects of the present disclosure relate to signal generation, and more particularly to the generation and use of a pulse-per-second signal by a fiber optic gyroscope.

BACKGROUND

Pulse-per-second (PPS) signals are traditionally used in a wide variety of applications which require precise time keeping, time measurement or other synchronization functions. A PPS signal is an electrical signal that has a width less than one second and a definitive pulse (i.e., a sharply rising or abruptly falling edge) that accurately repeats once per second. PPS signals are often generated and output by radio beacons, frequency standards, other precision oscillators and GPS receivers.

A wide variety of automated or computerized systems rely on a PPS signal to drive the systems operations. PPS synchronization may be used, for example, in cellular networks, telecommunications timing, digital TV and radio transmission, calibration laboratory systems, internet, stock market, computer games, and the like. Systems receiving the PPS signal may use it as a reliable clocking mechanism to synchronize operations of the system. Vehicles, for example, often may use a PPS signal to perform autonomous or semi-autonomous vehicle functions. Those functions may rely on an internal clock that, without periodic correction, may drift or become inaccurate over time.

Traditional PPS-reliant systems use a PPS signal output by a global positioning system (GPS) sensor to correct clock offsets and synchronize calculations and actions executed by the vehicle. When there is no GPS signal (e.g., in a tunnel, urban environment), however, there may be no PPS signal, which can cause problems with respect to vehicle calculations driving semi-autonomous or autonomous actions of the vehicle.

SUMMARY

According to one or more aspects of the present disclosure, a pulse-per-second generator is provided. The pulse-per-second generator may include, a light source, a coil of fiber optic cable in optical communication with the light source and a detector configured to receive light exiting the fiber optic cable. A signal generator may be configured to generate a pulse-per-second signal based on the path of light through the fiber optic cable.

According to another aspect of the present disclosure, a method of generating a pulse-per-second signal is provided. The method may include emitting from a laser source a first beam into a first end of a fiber optic coil and a second beam into a second end of the fiber optic coil. An interference pattern may be detected between the first and second beams in the fiber optic coil and a pulse-per-second signal may be generated based on the interference pattern.

According to another aspect of the present disclosure, a vehicle system for generating a pulse-per-second signal is provided. The system may include a gyroscope with a laser source, a fiber optic coil and a detector. A pulse-per-second generator may be configured to generate a pulse-per-second signal generated according to a phase difference between a first beam and a second beam input into opposing ends of the fiber optic coil of the gyroscope. The pulse-per-second signal may be used to synchronize operations of the vehicle.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide systems and methods for generating a PPS signal using a fiber optic gyroscope. The illustrative systems and methods disclosed herein may be implemented on a system or device that requires synchronization and precise time keeping to execute the system or device's operations. For example, as described below, a PPS signal generated by a fiber optic gyroscope may be implemented in a semi-autonomous or autonomous vehicle in which multiple on-board systems require time synchronization of operations. In such systems, an individual sub-system may have its own clocking mechanism, such as a crystal oscillator or the like, or the timing signals may be obtained from another subsystem, such as an inertial measurement unit ("IMU"). These localized clocking mechanisms are subject to drift or other faults in keeping and providing accurate time. The PPS signal generator described herein may provide a robust, ever-present PPS signal independent of environmentally or externally generated PPS signals, like those of a GPS sensor. The disclosed PPS generator may be used to correct or supplement the timing signals obtained from other subsystems, such as the IMU or GPS, when present.

Figure 1:
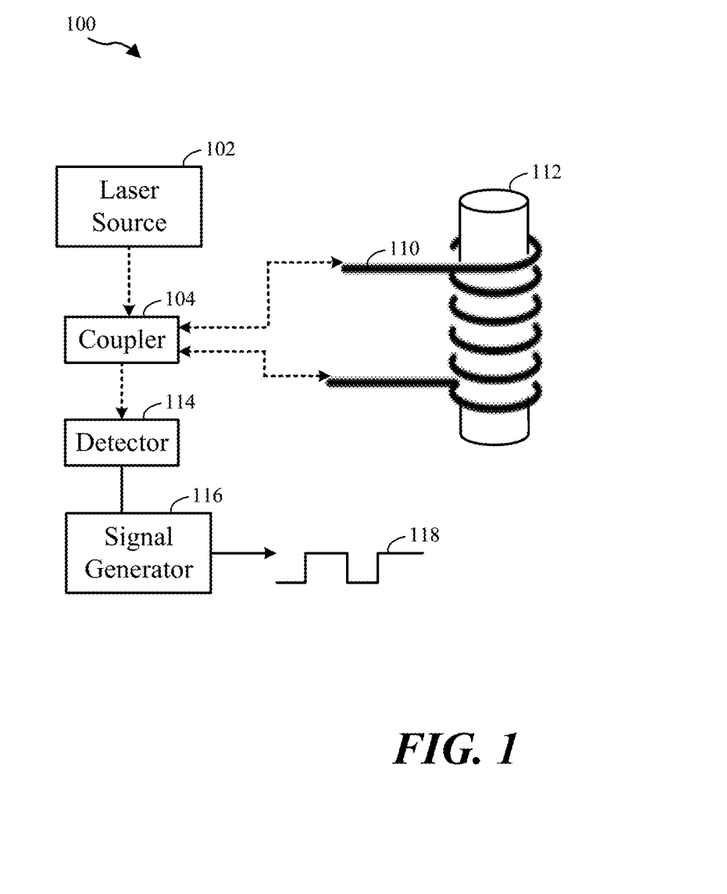
FIG. 1 depicts a block diagram of a fiber optic gyroscope according to an aspect of the disclosure.

FIG. 1 depicts a block diagram of a fiber optic gyroscope 100 in accordance with an aspect of the disclosure. A light source, such as a laser, or other stable and well characterized light source, may provide light (represented by a dashed line) to a coupler 104. The coupler 104 may split the light beam, using a beam splitter for example, from the light source 102 into two substantially identical beams that are then input into opposite ends of a fiber optic coil 110. The fiber optic coil may be wrapped around a cylinder 112 to allow for a long length of fiber optic cable.

As the light beams pass through the coil in opposite directions, the beams may undergo Sagnac interference as the gyroscope 100 undergoes movement or rotation. As the gyroscope 100, and specifically the fiber optic coil 110, rotate, at least one of the light beams traveling through the coil 110 may undergo a path change. The light beam traveling against the direction of rotation may experience a shorter path delay than the other, opposite-direction beam. That is, the time taken by the beams to pass through the coil is different. The two beams may exit the fiber optic coil 110 and be joined by the coupler 104.

The combined beam may undergo interference in which a phase difference reflects the difference in the time it takes each of the two light beams to travel through the coil 110. The difference in phase shift results in a change of intensity which may be measured by a detector 114, such as an interferometer. One of skill in the art will appreciate that the fiber optic gyroscope 100 of FIG. 1 may include additional components, including additional couplers, polarizers, modulators, amplifiers and the like, selected and configured to tune the gyroscope according to the needs of the application relying on the gyroscope. Such components and their implementation are known in the art and not discussed herein.

According to an aspect of the disclosure, the detector 114 may determine the phase difference between the opposing light beams exiting the fiber optic coil 110. A signal generator 116 may use the determined phase difference to generate a pulsed signal 118. The periodic and regular pulses of the pulsed signal 118 may carry the characteristics of a PPS signal for use in timekeeping and synchronization operations of the system or device on which the gyroscope 100 is implemented.

Figure 2:
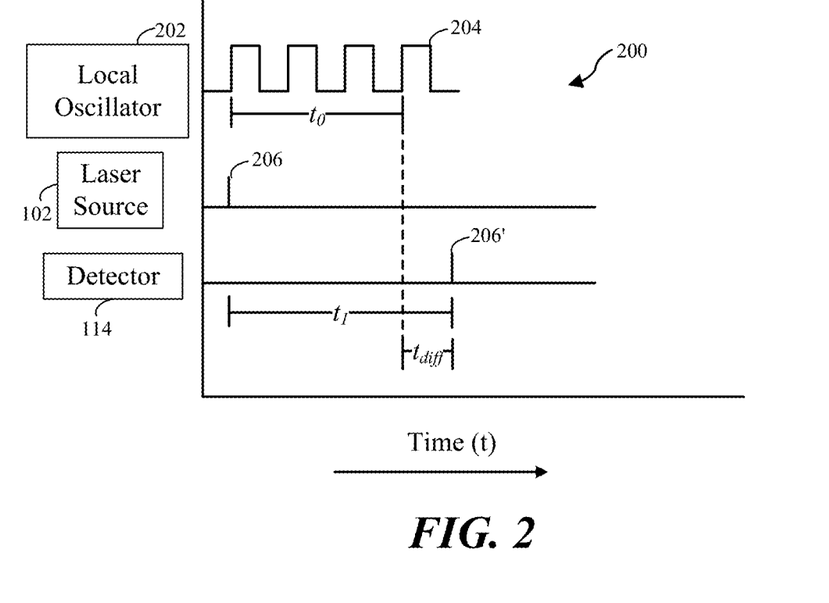
FIG. 2 is a timing diagram of an interval PPS measurement according to an aspect of the disclosure.

Alternatively, rather than focus on the interference and phase offset, a fiber optic gyroscope may focus on an interval measurement to determine how much time passes from when a single laser pulse is fired into the fiber optic cable and when the pulse is received by the detector 114. FIG. 2 depicts a timing diagram 200 illustrating such a system. A local oscillator 202, such as a crystal or the like, may be used to clock or synchronize system functions. The local oscillator may output a timing signal 204. Over time, and without corrective input, the timing signal 204 may drift and become inaccurate.

According to an aspect of the present disclosure, the length of the fiber optic cable is known, therefore it may be known how many edges, or ticks, are expected in the timing signal 204 to correspond to the amount of time, $t_0$, it should take the light to travel the length of the fiber cable. When the laser source 102 emits a light pulse 206 into the fiber, the light pulse travels the known length of the fiber coil and the detector 114 may detect the received pulse 206', coming out of the coil. Time, $t_1$, may correspond to the actual time that it took for the light pulse 206 to travel through the coil. Time, $t_1$, may be a known quantity corresponding to the properties of the fiber and speed of light in that medium.

A comparison of $t_0$ and $t_1$ yields a time difference, $t_{diff}$, between the expected time it takes to generate a number of pulses and the time it takes a pulse to travel the length of the coil. Measuring $t_0$ or $t_{diff}$ directly, however, would require a finer granularity of time than the local oscillator and if such a level of granularity were already in the system, time correction would not be needed. It is known, however, that at the end of time, $t_1$, the local oscillator is expected to be in a particular state or, if it is a counter, the counting of the ticks in the local oscillator is an expected number. Therefore, when the detector 114 receives the received pulse 206' at $t_1$, the local oscillator or its associated counter can be reset and essentially remove the effects taw.

Figure 3:
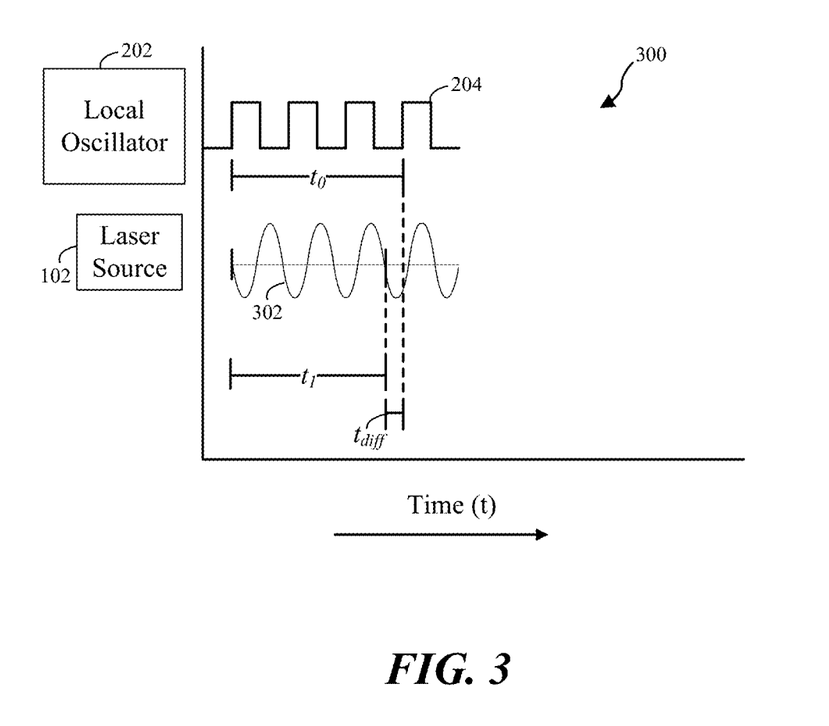
FIG. 3 is a timing diagram of a phase PPS measurement according to an aspect of the disclosure.

As detailed above, aspects of the fiber optic gyroscope may rely on an interference pattern that correlates to a phase offset between the two light beams. FIG. 3 depicts a timing diagram 300 illustrating such a system. When two identical beams from two light sources, or a split-beam from a single light source, are fired into opposing ends of a fiber optic coil, an interference pattern will form in the fiber optic cable when the two laser beams interact, as described above. That interference pattern 302 may be a known, or detectable pattern and therefore, a known wavelength may be measured off of the interference pattern 302, either as the fundamental wavelength or a higher order wavelength.

Once the known wavelength is measured, a measurable amount of time will have passed. Therefore, once the fundamental wavelength is detected, the counter may be checked. If the counter is not in an expected state, given the detected wavelength, the counter may be reset to that expected state, thus correcting the error. According to one aspect, sequence or series of wavelengths may be detected as the wavelengths may be occurring much more frequently than the counter is counting.

According to another aspect, using a similar principle as that of the time interval measurement, a time, $t_1$, known from the interference pattern, may be used to reset or correct the local oscillator 202, and its expected timing signal 204. It may also correct the associated counter at time $t_1$ even though the system believes the time, to, has passed, again removing the effects of $t_{diff}$.

Figure 4:
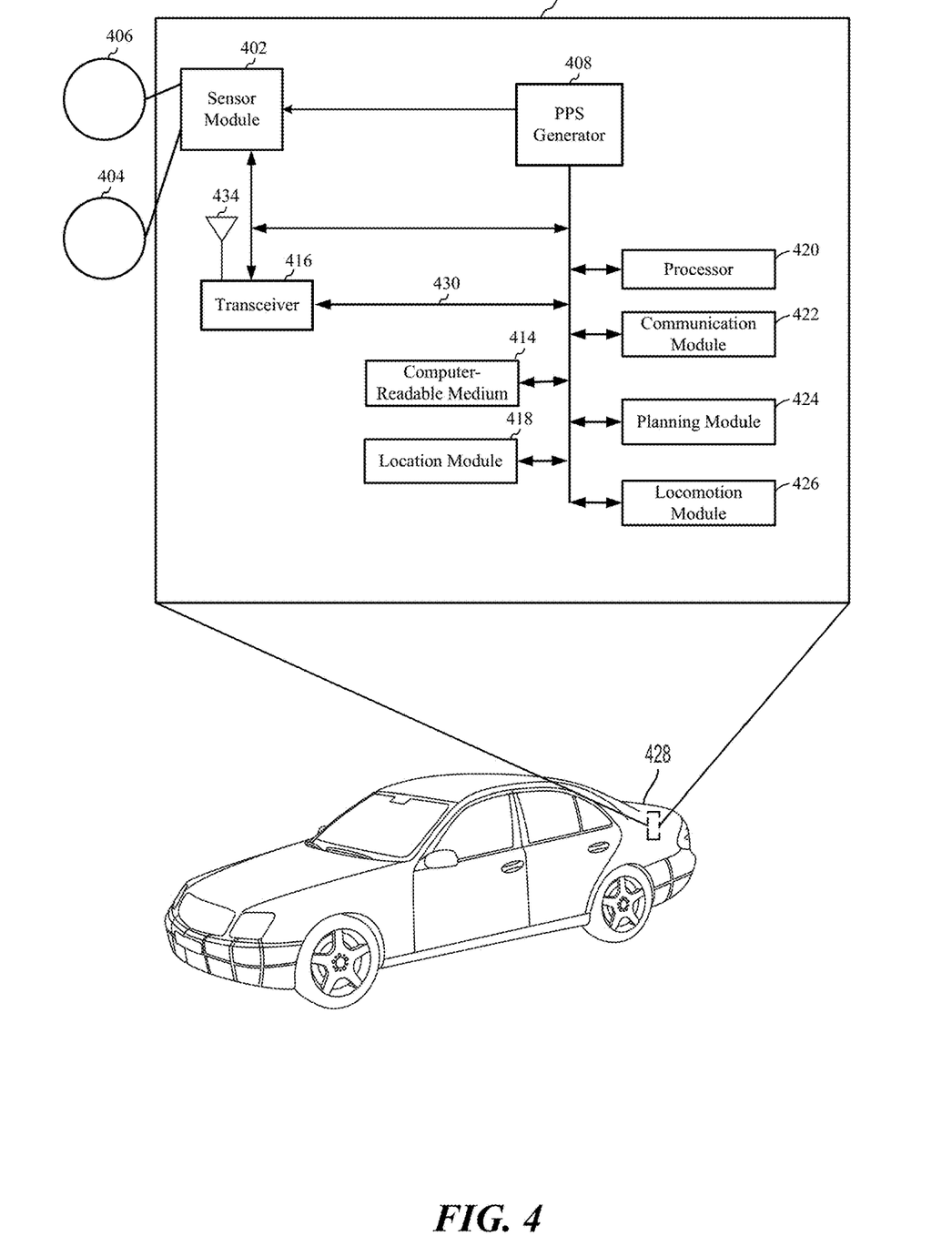
FIG. 4 is a diagram illustrating an example of a hardware implementation for a PPS signal generation system, according to aspects of the present disclosure Detailed Description.

FIG. 4 is a diagram illustrating an example of a hardware implementation for a PPS signal generation system 400, according to aspects of the present disclosure. The PPS generation system 400 may be a component of a vehicle, a robotic device, or other device. For example, as shown in FIG. 4, PPS generation system 400 may be a component of a car 428. Aspects of the present disclosure are not limited to the PPS generation system 400 being a component of the car 428, as other devices, such as a bus, boat, drone, or robot, are also contemplated for using the PPS generation system 400. The car 428 may be autonomous or semi-autonomous.

The PPS generation system 400 may be implemented with a bus architecture, represented generally by a bus 430. The bus 430 may include any number of interconnecting buses and bridges depending on the specific application of the PPS generation system 400 and the overall design constraints. The bus 430 may link together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The PPS generation system 400 may include a transceiver 416 coupled to the processor 420, the sensor module 402, a PPS generator 408, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the PPS generator 408 to a server (not shown).

The PPS generation system 400 may include the processor 420 coupled to the computer-readable medium 414. The processor 420 may perform processing, including the execution of software stored on the computer-readable medium 414 providing functionality according to the disclosure. The software, when executed by the processor 420, causes the PPS generation system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the PPS generator 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as WiFi, long term evolution (LTE), 3G, etc. The communication module 422 may also be used to communicate with other components of the car 428 that are not modules of the PPS generation system 400.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The PPS generation system 400 may also include the planning module 424 for planning a route or controlling the locomotion of the car 428, via the locomotion module 426, based on the analysis performed by the PPS generator 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The PPS generator 408 may be in communication with the sensor module 402, the transceiver 416, the processor 420, the communication module 422, the location module 418, the locomotion module 426, the planning module 424, and the computer-readable medium 414. In one configuration, the PPS generator may receive sensor data from the sensor module 402. The sensor module 402 may receive the sensor data from the first sensor 406 and the second sensor 404. According to aspects of the disclosure, the sensor module 402 may filter the data to remove noise, encode the data, decode the data, merge the data, extract frames, or perform other functions. In an alternate configuration, the PPS generator 408 may receive sensor data directly from the first sensor 406 and the second sensor 404.

As shown in FIG. 4, the PPS generator 408 may be used to generate a PPS signal used by one or more of the other modules in the system. A PPS signal may be used as a reliable and consistent clocking mechanism for the synchronization of numerous time-based calculations and actions of the car 428. The PPS generator may also be used to correct or reset the local oscillators or clocks resident on the vehicle 428. The PPS generator 408 of the present disclosure is advantageous over traditional systems in that the PPS signal generated by the PPS generator 408 is independent of the GPS signal that may be provided by the location module 418, transceiver 416 and antenna 434.

GPS-generated PPS signals may not be reliable or present in many autonomous or semi-autonomous driving scenarios, causing faulty or inconsistent synchronization of many time-based operations of the car 428. GPS signals and GPS-based PPS signals, may not be available to the processor 420, or other modules, when the antenna 434 is unable to receive a GPS signal from a satellite. For example, when vehicles are in tunnels, dense urban areas, steep valleys, or other areas where GPS coverage may not be strong or even available, or where the GPS-based PPS signal may become unreliable or unstable. This can cause time-based calculations and operations to be inaccurate, incomplete, or fail due to the inherent drift of local oscillators or clocks. The present disclosure presents a reliable and stable PPS generator 408 that does not rely on GPS signal reception, or any other outside signal reception, to provide a PPS signal for use by the various modules of the car 428.

The PPS signal may be output from the PPS generator 408 to one or more of the sensor module 402, the transceiver 416, the processor 420, the communication module 422, the location module 418, the locomotion module 426, the planning module 424, and the computer-readable medium 414. The PPS signal may also be used to correct an offset or drift of a local clock. For example, the PPS signal may be output to the processor 420 to synchronize, determine or control a set of actions that may be performed based on the detected objects and their respective locations in relationship to the car 428. The actions may be retrieved from the computer-readable medium 414 or the planning module 424. Additionally, based on the classified features, one or more of the modules 402, 408, 414, 416, 418, 420, 422, 424, 426 may determine or update an action for the car 428 using a synchronizing PPS signal generated by the PPS generator 408. The planning module 424 may perform route planning, collision avoidance, or other planning functionality based on the classified features.

Figure 5:
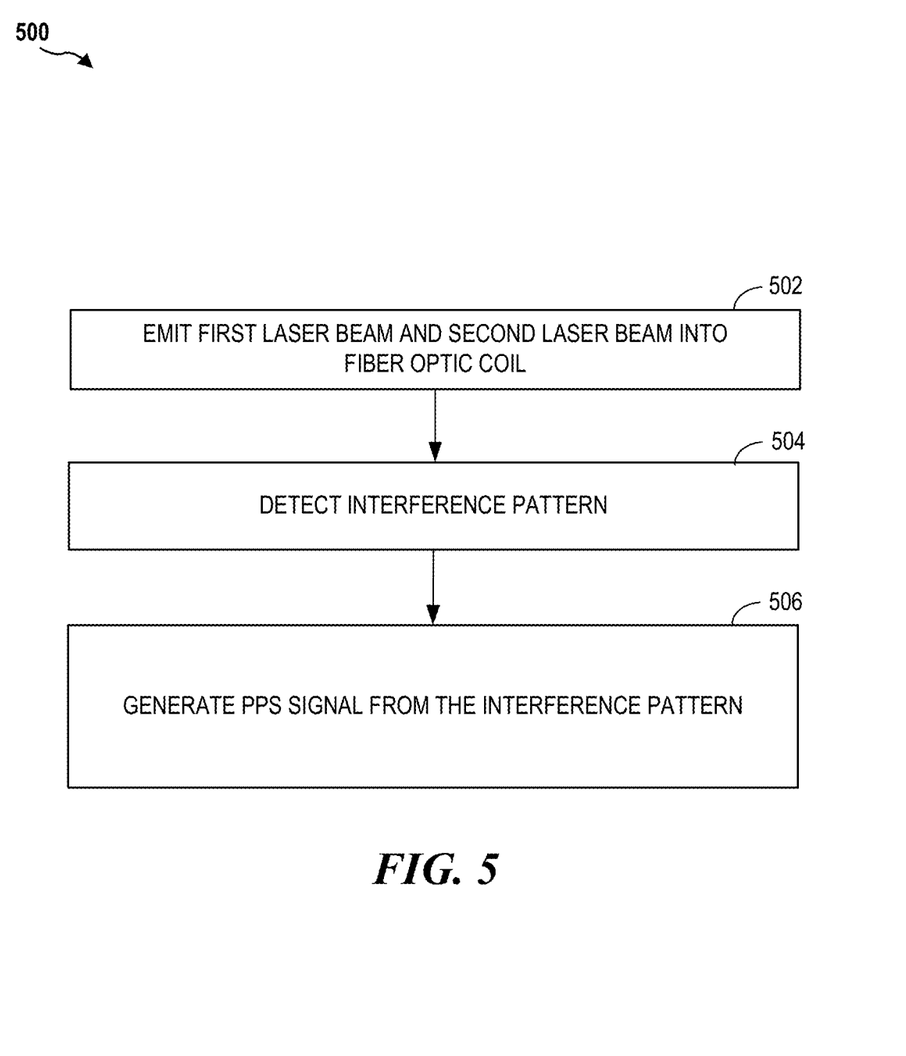
FIG. 5 illustrates a flow diagram for generating a PPS signal according to an aspect of the disclosure.

FIG. 5 illustrates a method 500 for generating a PPS signal, according to aspects of the present disclosure described herein. As shown in block 502, a first beam and a second beam from a laser source may be emitted into first and second ends of a fiber optic coil, respectively. As shown in block 504, an interference pattern between the two beams may be detected, as described herein. From the detected interference pattern, as shown in block 506, a pulse-per-second signal may be generated from the interference pattern.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A pulse-per-second generator comprising:
   a light source;
   a coil of fiber optic cable in optical communication with the light source;
   a detector configured to receive light exiting the fiber optic cable; and
   a signal generator configured to generate a pulse-per-second signal based on the path of light through the fiber optic cable.

2. The pulse-per-second generator of claim 1 wherein:
   the light source is configured to emit a first beam into a first end of the fiber optic cable and a second beam into a second end of the fiber optic cable;
   the detector is configured to receive an interference pattern between the first and second beams; and
   the pulse-per-second signal is based on a phase difference detected in the interference signal.

3. The pulse-per-second generator of claim 2 wherein the pulse-per-second signal is used to correct an oscillator, the correction based on an offset between the interference pattern and a timing signal of a local oscillator.

4. The pulse-per-second generator of claim 1 wherein:
   the light source emits a pulse of light into a first end of the fiber optic cable;
   the detector detecting a travel time of the pulse through the fiber optic cable to the detector; and
   the pulse-per-second signal is based on a time offset between the travel time and a local oscillator timing signal.

5. The pulse-per-second generator of claim 1 wherein the light source is a laser.

6. The pulse-per-second generator of claim 1 wherein the pulse-per-second generator provides correction to a timing signal.

7. The pulse-per-second generator of claim 6 wherein the timing signal comprises is a crystal oscillator.

8. The pulse-per-second generator of claim 1 wherein the pulse-per-second signal is used to synchronize events from one or more sensors of a vehicle.

9. The pulse-per-second generator of claim 8 wherein the vehicle is one of an autonomous vehicle or a semi-autonomous vehicle.

10. The pulse-per-second generator of claim 1 wherein the light source, fiber optic coil and detector form a fiber optic gyroscope.

11. A method of generating a pulse-per-second signal comprising:
    emitting from a laser source a first beam into a first end of a fiber optic coil and a second beam into a second end of the fiber optic coil;
    detecting an interference pattern between the first and second beams in the fiber optic coil; and
    generating a pulse-per-second signal based on the interference pattern.

12. The method of claim 11 wherein the interference pattern is a phase difference between the first and the second beam, the pulse-per-second signal based on the detected phase difference.

13. The method of claim 12 wherein the phase difference is based on the wavelength of the laser source.

14. The method of claim 12 wherein the phase difference is based on the frequency of the laser source.

15. The method of claim 11 further comprising resetting a timing signal based on the pulse-per-second signal.

16. The method of claim 15 wherein the oscillator is a part of an inertial measurement unit.

17. The method of claim 11 wherein the first beam and second beam are identical entering the fiber optic coil, the first and second beam formed by a beam splitter.

18. A vehicle system for generating a pulse-per-second signal comprising:
- a gyroscope including a laser source, a fiber optic coil and a detector;
- a pulse-per-second generator configured to generate a pulse-per-second signal, the pulse-per-second signal generated according to a phase difference between a first beam and a second beam input into opposing ends of the fiber optic coil of the gyroscope;
- wherein the pulse-per-second signal is used to synchronize operations of the vehicle.

19. The vehicle system of claim 18 wherein the vehicle is one of an autonomous vehicle and a semi-autonomous vehicle.

20. The vehicle system of claim 18 further comprising an inertial measurement unit including a local oscillator, the pulse-per-second generator configured to provide correction to the local oscillator.

\* \* \* \* \*